United States Patent [19]

Huber et al.

[11] Patent Number: 4,963,033

[45] Date of Patent: Oct. 16, 1990

[54] SCREW REFINER

[75] Inventors: Gordon R. Huber, Sabetha; Lawrence E. Schmelzle, Oneida, both of Kans.

[73] Assignee: Wenger Manufacturing, Inc., Sabetha, Kans.

[21] Appl. No.: 260,009

[22] Filed: Oct. 19, 1988

[51] Int. Cl.$^5$ .............................................. B29B 1/06
[52] U.S. Cl. ........................................ 366/81; 366/89; 366/90; 366/319; 366/323
[58] Field of Search ................. 366/79, 76, 77, 78, 366/80, 81, 83, 88, 89, 90, 318, 319, 322, 323, 324; 425/208, 209

[56] References Cited

U.S. PATENT DOCUMENTS

| | | | |
|---|---|---|---|
| 2,765,491 | 10/1956 | Magerkurth | 366/90 |
| 3,687,423 | 8/1972 | Koch | 366/81 |
| 3,897,938 | 8/1975 | Kim | 366/88 |
| 4,107,788 | 8/1978 | Anders | 366/90 |
| 4,140,400 | 2/1979 | Lovegrove | 366/81 |

*Primary Examiner*—Robert W. Jenkins
*Attorney, Agent, or Firm*—Hovey, Williams, Timmons & Collins

[57] ABSTRACT

An extruder for processing wood particles, shavings or sawdust is particularly useful for the production of a refined product exhibiting a large number of separated, individual fibers each of a relatively long length as is desirable in the production of a fiber core for a composite particle board. The extrusion apparatus comprises an elongated barrel and a flighted screw rotatable within the barrel, with the final downstream section of the screw being of a configuration to sequentially present three processing zones each having a compression region, a restricted region and a decompression region. The three processing zones of the final screw section cooperate with a compression region and restricted region formed in the final head section to choke the advancement of wood materials through the extruder sufficiently to enable satisfactory processing of the same without the use of a final die or restricted orifice disposed on the outlet of the extruder barrel. In particularly preferred forms, restriction elements in the form of rectangular bars are disposed across the grooves of the screw and grooves of the head in the restricted region, and the bars are oriented in acute angular relationship relative to each other in scissors-like fashion to promote rolling and twisting apart of the fibers while maintaining the longitudinal integrity of the same.

55 Claims, 2 Drawing Sheets

SCREW REFINER

BACKGROUND OF THE INVENTION

1. Field of the Invention

This invention broadly relates to a method and apparatus for the extrusion of wood chips, shavings or sawdust to produce a refined product having a multitude of separated fibers of relatively long lengths and narrow cross-section. More particularly, the invention is concerned with an extruder head and screw each having bar-like restriction elements extending transversely across the grooves between flighting, and the bars interact in a scissors-like fashion to roll and twist the fibers apart without excessive transverse severing of the same. A final, conical section of the extruder screw has two juxtaposed grooves each presenting three processing zones which each include a compression region, a restricted region and a decompression region sequentially arranged along the length of the grooves and upstream of an annular outlet, in order to choke the flow of wood through the extruder and roll the wood particles against each other without the use of a die at the outlet of the extruder. The extrudate is of a flowable nature which can be easily stored, conveyed, or handled. Additionally, the extrudate is highly desirable for use in the production of a special core for particle board, since the relatively thin fibers may be readily and efficiently coated to a smooth finish after the board is cut, while the long lengths of the fibers interconnect to form a stronger composite board product than would otherwise be possible.

2. Description of the Prior Art

The use of particle board for furniture, cabinets and other types of finished construction projects has significantly increased in recent years. Particle board has in many instances replaced plywood due to the improved dimensional stability of particle board and the lower cost of the same. In most cases, particle board is comprised of relatively flat, small chips that are bonded together by an adhesive such as epoxy resin.

However, particle board tends to have relatively large voids and pores between the chips because the latter, during manufacture of the board, resist compression to a dense, tightly packed condition. As a result, sawn or cut edges of the board present a number of voids and cavities which, for the most part, cannot be readily coated to a smooth finish. Consequently, the cut edges of the particle board when used in furniture, cabinets and the like are normally trimmed with a piece of natural wood of a type selected to match the desired finish to be applied to the faces of the board and other components of the finished structure. As can be appreciated, the usual practice of selecting, cutting and affixing a trim strip to the sawn edges of particle board significantly increases the overall cost of the finished product as well as the time expended in construction of the same.

Other types of composition board, and particularly those products known as fiber board, have been manufactured by processing shavings, wood chips or sawdust in a disc refiner or pressurized refiner and then applying an adhesive and pressing the refined fibers together in order to form the resultant board product. The core of fiber board, being comprised of tightly compacted, small fibers, presents a relatively smooth edge when sawn due to the small size of the voids between adjacent fibers, in contrast to the larger voids presented along the cut edge of particle board. Unfortunately, fiber board is relatively expensive, due in part to high energy costs which are associated with operation of the disc refiner or pressurized refiner, the latter of which requires significant amounts of steam energy.

Hence, it would be a desirable advance in the art if means were provided to refine wood chips, shavings or sawdust into a product that is characterized as having thin, at least partially separated fibers each of a relatively long length, but with significantly reduced costs for energy in comparison to the operating expenses associated with the use of disc refiners and pressurized refiners. Advantageously, such a refined product could be utilized in the manufacture of a special core for particle board, so that cut edges of the same can be easily coated to present a smooth, finished appearance that matches the face of the boards or other components of the finished article.

SUMMARY OF THE INVENTION

Our present invention represents an especially effective means for processing wood particles of various sizes into a highly refined, uniformly-sized product that is comprised of a large number of individual as well as partially separated fibers each having a relatively long length and a small transverse cross sectional area. In accordance with the invention, an extruder of novel construction is provided for producing the refined product with an operating cost far less than the costs normally associated with disc refiners, hammermills and pressurized disc refiners.

The extrusion apparatus of the present invention includes an extruder barrel having an elongated bore, and a screw rotatable about its longitudinal axis within the bore of the barrel. A downstream section of the barrel and the screw have generally conical configurations with flighting means defining respective elongated, helically shaped grooves that cooperate to advance the wood particles toward an annular extruder outlet which takes the form of an open, unrestricted area between the downstream end of the screw and the surrounding regions of the bore. Importantly, the flighting defining the grooves in the final barrel head section and the final screw section have a certain compression ratio gradient that functions to restrict or choke the flow of particles through the extruder upstream of the outlet so that the wood particles are sufficiently retained and refined before being discharged through the non-plugging, annular outlet.

In certain forms of the invention, each of two side-by-side grooves formed in the final screw section presents three processing zones which are sequentially arranged along the length of the groove. Each of the processing zones includes a compression region wherein the root diameter between flight portions of the groove is increased to compress the particles, and a restricted region having at least one bar which extends transversely across the groove to further compress the particles and force the same through a relatively narrow restricted gap between the outer surfaces of the bar and adjacent, stationary portions of the head. Finally, each of the three processing zones also includes a decompression region located immediately downstream of the corresponding restricted region, and preferably the decompression region is established by significantly reducing the root diameter of the groove between the flighting portions to create an enlarged free volume that enables the particles to expand somewhat and rearrange before reaching the compression region of the next adjacent, downstream processing zone.

Thus, the advancing wood particles encounter a series of compression regions wherein the velocity of the particles along with the amount of pressure applied to the particles is steadily increased, as well as a series of decompression regions wherein the velocity of the particles is decreased while pressure applied to the particles is relieved to enable the same to mix and expand. The grooves of the screw are of relatively wide width so that the fibers are separated by the grinding action of wood particles against other wood particles, in contrast to disc refiners where grinding occurs by shearing wood against metal. In preferred embodiments of the invention, the inclined bottom wall of the screw within the compression regions is roughened to retard the advancement of wood particles and further promote the grinding action between adjacent particles.

The compression regions and the corresponding, adjacent restricted regions are each formed, along with adjacent regions of the mating head, to present a series of increasingly smaller restricted areas through which the particles must pass as the same advance through the refiner. The conical configuration of the final screw section and the adjacent head section also function to cause the particles to be increasingly compressed during advancement along the barrel. In addition, the decompression regions following each corresponding restricted region have increasingly smaller free incremental volumes available for passage of the particles, so that each of the processing zones compresses the product with sufficient flow retardation that the use of dies at the outlet of the extruder is rendered unnecessary. This latter factor is particularly advantageous in that refined wood cannot readily flow through 90° turns of a configuration similar to the passages that are normally found immediately upstream of extruder dies.

In preferred forms of the invention, the grooves of the final downstream head section are also of particular configuration which establishes a compression region and a restricted region located adjacent the third processing zone of the screw. In addition, bars extending transversely across the groove in the restricted region of the head are oriented at a slight acute angle relative to the bars in the third restricted region of the screw. The stationary bars of the head cooperate with the bars of the rotating screw in a scissors-like fashion so that the fibers are twisted apart during passage through the relatively narrow area between the bars without excessive severing of the length of the same. As a consequence, the longitudinal integrity of the fibers is, in large part, retained which renders the refined product extremely desirable for use in the manufacture of fiber board cores for particle board as well as in other applications.

These and other objects of the invention will be made more clear in the course of the following description of a preferred embodiment of the invention.

DETAILED DESCRIPTION OF THE DRAWINGS

Figure 1:
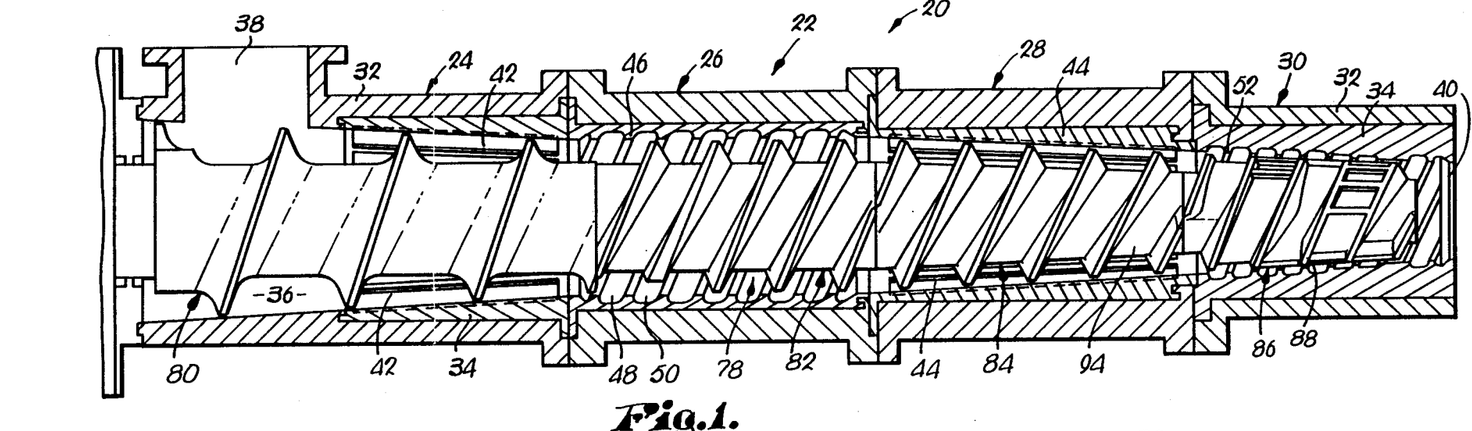
FIG. 1 is a fragmentary, side cross-sectional view of an extruder apparatus constructed in accordance with the present invention, and shows an elongated, rotatable screw of the extruder that extends along the length of a bore of the extruder barrel.

An extruder constructed in accordance with our present invention is broadly designated by the numeral 20 in FIGS. 1-10 and includes a barrel 22 having four interconnected head sections 24, 26, 28 and 30 as is illustrated in FIG. 1. Each of the sections 24-30 includes an outer casing 32 and an inner insert 34 and the inserts 34 represent structure defining an elongated bore 36 that extends along the length of extruder 20. The bore 36 includes an upright inlet 38 located at the upstream end of the first head section 24, and also has an outlet 40 at the final or downstream head section 30 which will be described in more detail hereinafter.

Viewing FIG. 1, the insert 34 of first head section 24 downstream of inlet 38 presents a series of straight, converging, rectangular ribs 42 that are spaced around the perimeter of adjacent regions of the bore 36 and extend in planes parallel to the longitudinal axis of the latter. Similarly, the insert 34 of the third head section 28 also has a spaced series of rectangular, essentially straight ribs 44 that extend in planes generally parallel to the longitudinal axis of bore 36. The inserts of head sections 24, 28 are both tapered to present a generally conical configuration.

The insert 34 of the second head section 26 has double flighting 46 which presents two separate, side-by-side grooves 48, 50. Each of the grooves 48, 50 is elongated and has a generally helical configuration; furthermore, the region of bore 36 within the flighting 46 is of an untapered, generally cylindrical shape, in contrast to the conical regions of the bore 36 that are formed by the tapered configuration of inserts 34 for the head sections 24, 28.

Figure 2:
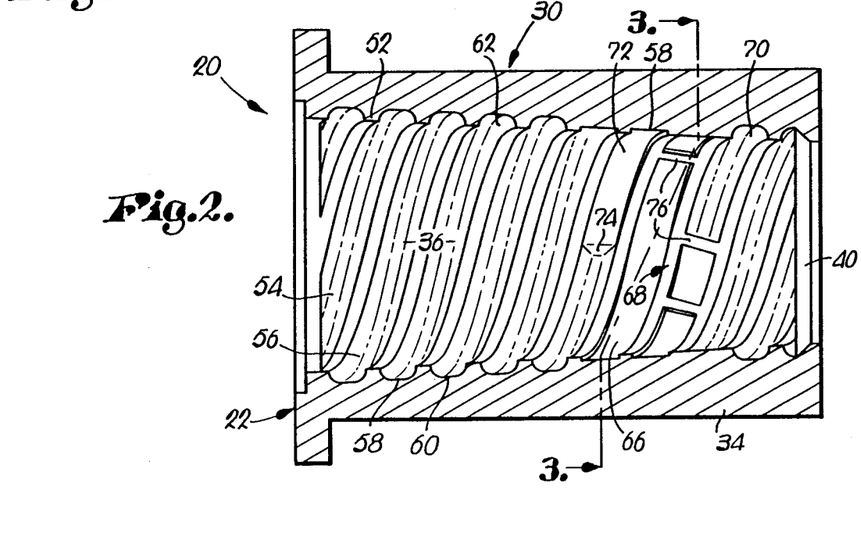
FIG. 2 is an enlarged, cross-sectional view of the final or downstream head section of the extruder depicted in FIG. 1 and illustrates cross-bars disposed in the grooves of the flighted head section.

The final or downstream head section 30 has "quad" flighting 52 that presents four juxtaposed, separate grooves 54-60. Referring to FIG. 2, and also to FIG. 3 (which depicts only groove 58), each of the grooves 54-60 presents in sequential order a passage region 62 that is followed by a processing zone 64 having a compression region 66, a restricted region 68 and a decompression region 70. Viewing FIG. 3, it can be seen that the root diameter of the groove 58 decreases in such fashion that a bottom wall 72 of the groove 58 is inclined in the form of a ramp 74 between the passage region 62 and the compression region 66. Thereafter, the bottom wall 72 continues along the length of the groove 58 in a steadily decreasing, spiral fashion corresponding to the tapered profile of the bore 36. The compression region 66 extends through an arc of approximately 135° between ramp 74 and the beginning of the restricted region 68.

Two elongated, rectangular element or cross-bars 76 are disposed within the restricted region 68 of each of the grooves 54-60, and extend in transverse relationship to adjacent portions of the flighting 52 as can be appreciated by reference to FIG. 2. The bottom wall 72 of grooves 54-60 between the bars 76, 76 is spaced from the innermost surface of bars 76 in general alignment with the bottom wall 72 within the compression region 66, although the free incremental volume (i.e., the groove volume per incremental or unit length of the groove along its helical path) of the grooves 54-60 between the bars 76 of the restricted region 68 is somewhat less than the incremental volume of the grooves 54-60 within the compression region 66 due to the conical configuration of the bore 36 within head section 30. The decompression region 70 begins immediately downstream of the second bar 76, and is formed by removing material within the insert 34 until the diameter of the bottom wall 72 within the decompression region 70 is greater than the diameter of the bottom wall 72 within the compression region 66 or between the bars 76 of the restricted region 68.

Preferably, the top surface of the bars 76 are flush with adjacent portions of the flighting 52. As such, the grooves 54-60 present incremental volumes in locations 75, 77 (FIG. 3) in both the compression region 66 and the decompression region 70 respectively and directly adjacent the restricted region 68 which is greater than any incremental volume of the groove 58 in a location 79 that is between the bar 76 and the longitudinal axis of bore 36, since the free incremental volume of the grooves 54-60 inwardly from the bars 76 is equal to zero. Moreover, the restricted region 68 is disposed upstream from the outlet 40 of the bore 36 to restrict or choke the passage of wood chips advancing through the extruder 20 before the same reach outlet 40.

Figure 3:
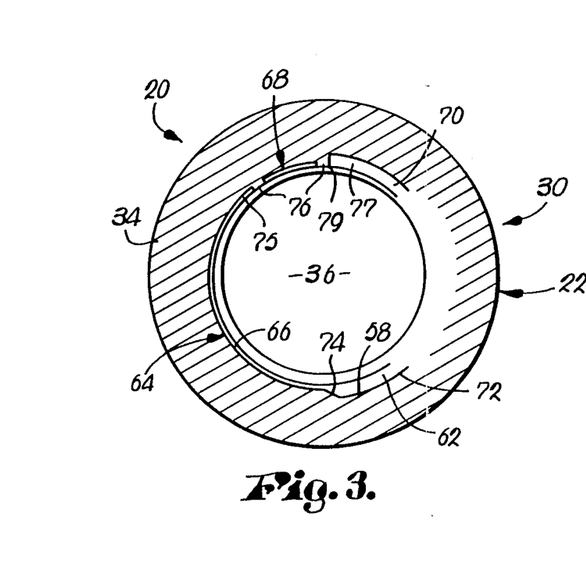
FIG. 3 is an end cross-sectional view taken along line 3-3 of FIG. 2 to show a processing zone comprising a compression region, a restricted region and a decompression region.

The configuration of grooves 54, 56 and 60 is similar in essential respects to the configuration of groove 58 (shown in FIG. 3). However, as can be appreciated by a reference to FIG. 2, the processing zones 64, including the bars 76, are disposed approximately 90° around the longitudinal axis of bore 36 from each other so that the respective compression regions 66 and bars 76 of grooves 54, 58 are spaced across each other within the bore 36 while the compression regions 66 and bars 76 of grooves 56, 60 are located across from each other in transverse relationship to the compression regions 66 and restricted regions 68 of bars 54, 58.

Referring again to FIG. 1, an elongated screw, broadly designated 78, is rotatable about its longitudinal axis and extends along the length of bore 36. The screw 78 is comprised of four screw sections 80, 82, 84 and 86 which are releasably secured together for simultaneous rotation. Each of the sections 80-86 presents at least one helically-shaped groove for receiving material to be processed and advancing the same in downstream direction toward the outlet 40 of bore 36 as the screw 78 is rotated.

The first or inlet screw section 80 which is depicted in FIG. 1 is preferably a single flight, tapered screw that presents a decreasing volume in directions away from the inlet 38 of bore 36. The second screw section 82 is a modified, double flighted construction which can be described as a "1½" flighted screw. That is, the upstream portion of one of the flights is tapered to begin at the shank of the screw section 82 adjacent the beginning of the same, and then gradually increase in diameter until equal in dimension to the constant outer diameter of the other flight.

The screw section 84 has a conical configuration complemental to the tapered, overall profile of the bore 36 within head section 28. The screw section 84 is in this instance a double flighted screw that is aligned with the screw sections 82, 86 such that the ends of the flighting of screw section 84 are closely adjacent the respective ends of the flighting of sections 82, 86 to present a smooth transition for material passing along each of the two grooves.

Figure 4:
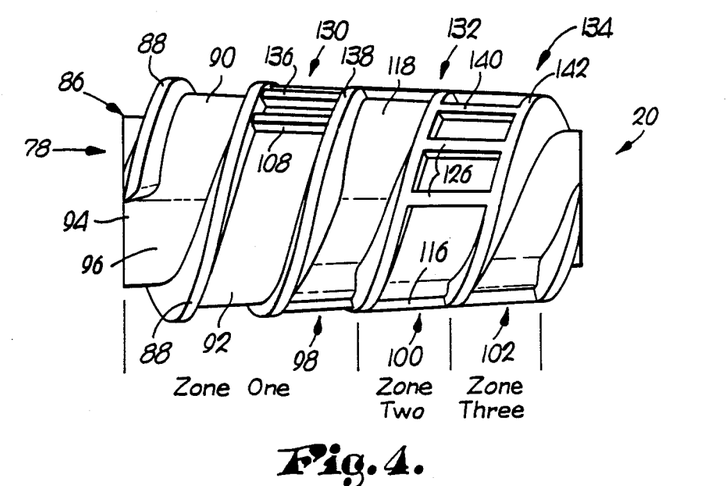
FIG. 4 is an enlarged, side elevational view of the final, double flighted screw section shown in FIG. 1, depicting the location of three processing zones which are located along the length of each groove.

The screw section 86 is depicted in greater detail in FIG. 4 and has double flighting 88 defining two juxtaposed, elongated grooves 90, 92 having a generally helical configuration. The flighting 88 is fixed to a shank portion 94 and presents an overall tapered profile or conical configuration.

A relatively short passage region 96 is located at the upstream end section of each groove 90, 92 and presents an available or free incremental volume that is approximately equal to the free incremental volume of the adjacent reaches of the grooves at the downstream end section of third screw section 84. Each groove 90, 92 of the screw section 86 also presents, in sequential order, three processing zones, 98, 100, 102 which correspond to Zones One, Two and Three that are designated in FIG. 4.

Figures 5, 7:
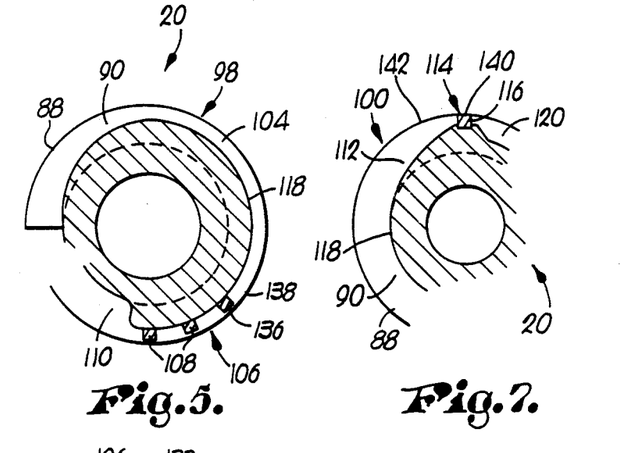
FIGS. 5-10 are enlarged, end cross-sectional views of the final screw section shown in FIG. 4 and taken along different locations of the three processing zones for each of the two grooves.

The three processing zones 98, 100, 102 of groove 90 can be better understood by comparison of FIGS. 4 to FIGS. 5, 7 and 9. As shown in FIG. 5, the bottom wall of the groove 90 within the first processing zone 98 steadily increases to present a compression region 104 that extends in this instance in an arc approximately 235° about the longitudinal axis of screw 78. A restricted region 106 is formed immediately downstream of compression region 104 and includes three spaced, parallel elements or rectangular bars 108 that extend across the groove 90 between adjacent, continuous portions of the flighting 88 and lie in planes parallel to the longitudinal axis of bore 36. Also, as shown, a decompression region 110 is disposed downstream of the third bar 108 of the restricted region 106.

The second processing zone 100 of groove 90 is shown in FIG. 7, and includes a compression region 112 that extends approximately 90° about the longitudinal axis of screw section 86 until reaching a restricted region 114 having a single bar 116 which extends between adjacent portions of flighting 88 in a plane parallel to the longitudinal axis of bore 36. Downstream of bar 116, a bottom 118 of groove 90 is inclined in the nature of a ramp and leads to a relatively short decompression region 120.

Figure 9:
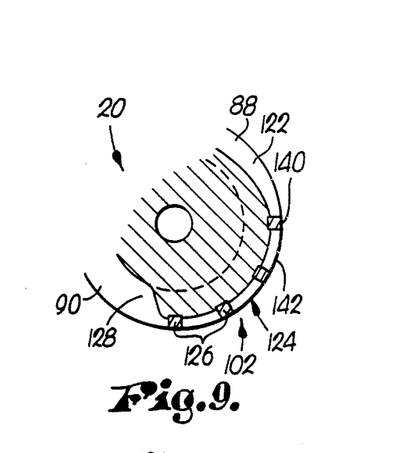

The nature of the third processing zone 102 of groove 90 can be understood by reference to FIG. 9. Zone 102 includes a compression region 122 that extends along an arc of approximately 45° about the central axis of screw section 86. A restricted region 124 is located immediately downstream of compression region 122, and includes four spaced, elongated elements or elongated bars 126 that extend between adjacent, continuous portions of the flighting 88 and lie in planes parallel to the longitudinal axis of bore 36. The restricted region 124 lies along an arc of approximately 90° about the screw section 86, and terminates in a final decompression region 128 that begins with a ramp-like section of the bottom wall 118 of groove 90.

In similar manner, groove 92 also presents three distinct processing zones 130, 132 and 134 substantially similar to corresponding zones 98–102, but disposed on opposite sides of the screw section 86 at 180° around the perimeter of the same. Each of the zones 130–134 present, in sequential order, a compression region 104, 112, 122 respectively followed by a restricted region 106, 114, 124 having transverse bars 108, 116, 126, and a decompression region 110, 120, 128 wherein the root or bottom wall of the groove 92 is undercut to present a free incremental volume greater than any free incremental volume of the groove 92 within the corresponding restricted regions or compression regions.

By observation of FIGS. 5–10, it can be appreciated that the grooves 90, 92 within the respective processing zones 98–102, 130–134 have free incremental volumes of values within the compression regions 104, 112, 122 which are greater than any incremental volume of the corresponding groove 90, 92 in the next adjacent, downstream restricted regions 106, 114, 124 in a direction radially outwardly from the respective bars 108, 116, 126. As an example, in FIG. 6 the incremental volume of groove 92 at location 129 in compression region 104, as well as the incremental volume of groove 92 at location 131 in decompression region 110, is greater than the incremental volume of groove 92 outwardly from bar 108 at location 133.

Figures 6, 8:
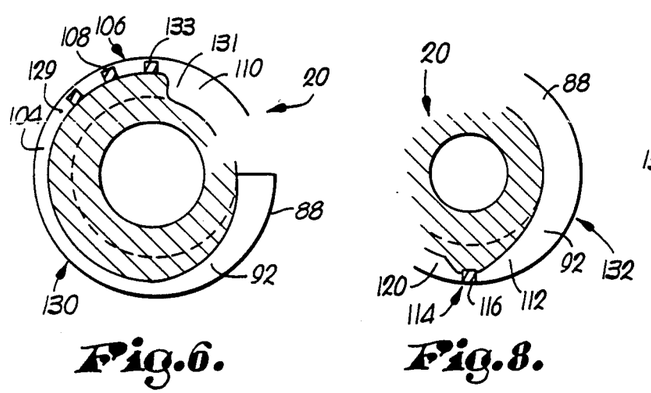
Figure 10:
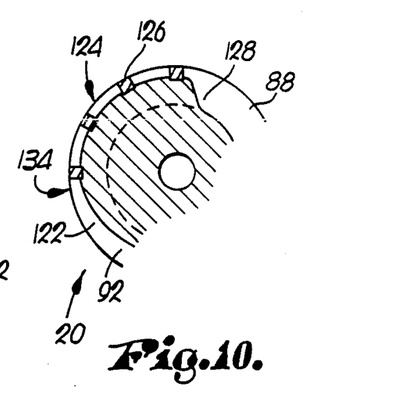

In addition, the disposition and configuration of the rectangular, parallel, elements or bars 108, 116, 126 is such as to cause the passage areas or gaps radially outwardly of the bars to be smaller as the outlet 40 of bore 36 is approached. In particular, FIG. 5 shows that an outer surface 136 of bar 108 is spaced slightly from the outer surface 138 of the adjacent portions of the flighting 88 while in FIGS. 7 and 9 the outer surface 140 of bars 116, 126 is substantially flush with the outermost surface 142 of adjacent portions of flighting 88 (in this regard, see also FIG. 4). The outer surfaces of bars of the restricted regions within the processing zones 130–134, as shown in FIGS. 6, 8 and 10, are substantially identical in disposition and configuration to the aforementioned surfaces 136, 140 of bars 108, 116, 126 relating to the respective outer surfaces 136, 140.

The flighting 88 has an outer diameter which gradually decreases along the length of grooves 90, 92 such that the screw section 86 presents an overall conical configuration. Thus, the pressure exerted on materials passing through the extruder 20 increases as the materials sequentially advance through the compression regions and the restricted regions of each of the processing zones 98–102 and 130–134. Moreover, the bottom walls 118 of grooves 90, 92 may be roughened within the corresponding compression region of each zone 98–102, 130–134 to further promote rolling and twisting of the materials as the same advance toward bore outlet 40.

Each of the outwardly projecting bars 108, 116 and 126 extend completely across the reaches of corresponding grooves 90, 92 and lie in planes extending along the longitudinal axis of bore 36. Moreover, by comparison of FIGS. 2 and 4, it can be observed that the outwardly projecting bars 76 within each of the restricted regions 48 of the grooves 54–60 of head section 30 are oriented in acute angular relationship relative to the direction of extension of the bars of screw section 86, including the four bars 126 of each restricted region 124 of the final, third processing zone 102, 134 of screw section 86. As such, the stationary bars 76 of the final head section 30 are disposed in scissors-like fashion relative to the bars 126 within the restricted region 124 of the third processing zones 102, 134 of final screw section 86, which has been found to promote twisting and separation of the fibers of wood particles when the same are introduced into the barrel 22 of extruder 20.

Operation

It has been found that the extruder 20 in accordance with the present invention is particularly useful for processing wood materials, including wood particles, chips, shavings and sawdust and refining the same to a final product that is characterized as having a large number of individual, separated fibers each of relatively long length and with a narrow, transverse cross-sectional area. Preferably, the wood particles have a moisture content in the range of about 10% to about 50% by weight of water when introduced into the inlet 38, although better results have been observed when the moisture content of the wood particles is within the range of about 25% to about 30% by weight of water. In addition, the wood particles preferably have a length of about 1.5 mm. to about 38 mm. immediately prior to being introduced into the inlet 38 of bore 36.

During operation of the extruder 20 to refine wood particles, the screw is preferably rotated at a speed within the range of about 100 r.p.m. to about 500 r.p.m., although better results can be observed when the screw is rotated at a velocity within the range of about 250 r.p.m. to about 350 r.p.m. The particles of wood are advanced first through the sections 24, 26 and then fed into the third head section 28 which compresses the particles somewhat due to the overall conical configuration of the screw section 84 and the bore 36 within head section 28.

Next, the wood material reaches the first processing zones 98, 130 and is further compressed due to the increase in root diameter of the bottom wall 118 between the flighting 88 within compression region 104 (see FIG. 5). The bottom wall 118, as described earlier, is preferably roughened to promote rolling of the fibers and cause the fibers to grind against each other and separate from adjacent fibers of the same particle.

Subsequently, as the wood material reaches the restricted region 106, the particles are forced over the top of the bar 108 which presents a narrow area or gap through which the same can pass. Consequently, additional fiber separation occurs in area of the groove 90 adjacent the bars 108. Next, the particles approach the decompression region 116 wherein the bulk density of the material is decreased and the particles expand somewhat, which further facilitates rolling and mixing of the particles before next advancing to the compression region 112 of the second processing zone 100.

Similarly, the particles during advancement through zones 100, 102 and 132, 134 are subjected to processing similar to the processing occurring in zones 98, 130. In zones 100, 102, 132, 134 however, the wood material is exposed to higher pressures due to the fact that the same amount of material must flow through an increasingly smaller free incremental volume because of the tapered or conical profile of screw section 86. In addition, the flush disposition of the outer surfaces 140 of the bars 116, 126 forces the particles of wood to pass through a smaller restricted opening than is presented outwardly of the bars 108 in the first processing zone 98.

Importantly, the wood material when passing through the third processing zones 102, 134 is subjected to the action of bars 126 in the restricted regions 124 which move relative to the stationary bars 76 of the restricted regions 68 of head section 30. Bars 76, 126, being disposed in acute angular relationship relative to each other, function in a scissors-like fashion to facilitate additional twisting of the wood fibers without shortening the length of an excessive number of the same.

In preferred embodiments of the invention, the free incremental volume of the bore 36 in the first head section 24 adjacent the inlet 38 is in the range of about 100 times to about 20 times the free incremental volume of the bore 36 surrounding the end of the final screw section 86 in the region adjacent outlet 40. Better results are observed, however, when the same, aforementioned free incremental volume adjacent the inlet 38 is in the range of about 70 times to about 50 times the free incremental volume adjacent outlet 40. In particularly preferred embodiments, the free incremental volume in the bore 36 adjacent inlet 38 is about four times the free incremental volume of bore 36 at the downstream end of the third head section 28, and in turn the latter free incremental volume is about 15 times the free incremental volume in bore 36 in the region adajcent outlet 40.

The particles of wood, during advancement through the bore 36, are compressed in the final restricted region 124 of the third processing zones 102, 134 to a bulk density in the range of approximately seven to approximately 20 times the bulk density exhibited by the wood particles when introduced through the inlet 38 of extruder 20. The temperature of the wood particles during passage through the barrel 22 is advantageously in the range of about 93° C. to about 175° C., although better results have been observed when the wood particles have a temperature of about 110° C. If desired, moisture may be added to the wood prior to extrusion in order to increase steam generation during the refining process and soften the particles to further facilitate separation of the fibers.

After the wood particles travel along the length of the three processing zones 98-102 and 130-134 of grooves 90, 92 respectively, the particles are discharged through outlet 40 which takes the form of an annular opening surrounding the downstream end portion of final screw section 86 and the adjacent, surrounding portions of the final head section 30 downstream of bars 76.

The compression regions 104, 112, 122, and particularly the restricted regions 106, 114, 124 of each of the processing zones 98-102 and 130-134, along with the compression region 66 and restricted region 68 of the four grooves 54-60 in head section 30, are operable to restrict or choke the advancement of materials passing through the extruder 20, with the materials being subject to a greater compressive force in each successive processing zone. The materials are discharged directly through the annular outlet 40 into the atmosphere without the use of dies or other types of restricted orifices disposed on the downstream end of the final head section 30, which is particularly advantageous in that the refined wood particles do not readily flow around corners, as might otherwise be presented during passage of the materials toward an outlet die opening.

Advantageously, the configuration of the extruder barrel 22 in combination with the configuration of the screw 78 causes the wood particles to rub against each other for proper rolling and twisting and produce a refined product having separated fibers of relatively long length. The "wood against wood" action promoted by extruder 20 causes significantly less wear on components of the latter in comparison to, for instance, disc refiners where "wood against metal" forces are presented. Additionally, it has been observed that the energy requirements of extruder 20 are significantly less than the energy that would be required for processing a similar amount of wood material by a disc refiner.

EXAMPLE

In this test, the first screw section 80 had a length of 6096 mm. and had flighting with an outer diameter of 3023 mm. adjacent inlet 38 which steadily decreased to 235° at the end of the first section 80. The second or intermediate screw section 82 had a length of 4255 mm., and flighting having a straight, cylindrical configuration with a diameter of 2350 mm.

The extruder 20 was further equipped with a third screw section 84 having a length of 4636 mm., and an outer flighting diameter which tapered from 2350 mm. to 1867 mm. The final screw section 86 had a length of 3480 mm., and had flighting which tapered from a diameter of 1867 mm. to 1499 mm.

The extruder 20 in this respect was of a configuration substantially identical to that shown in FIG. 1, in that the screw 78 presented three processing zones each with compression regions, restricted regions having transverse bars, and corresponding, downstream decompression regions. In addition, the head sections 24–30 were substantially as depicted in FIGS. 1–3.

A quantity of wood particles, adjusted by addition of water to moisture content of 30% by weight and having an overall size ranging from 1.6 mm.$^2$ to 0.08 mm.$^2$ in cross-sectional area, was fed into the extruder 20 at a rate of 3636 kg/hr. The screw 78 was rotated at a speed of 300 r.p.m. which caused the tip speed of the screw 78 in the third processing zones 102, 134 of the final screw section 86 to be about 173.7 meters/minute. The load in kilowatts of the extruder was 350. The load on the extruder without the mixture present at 300 r.p.m. is about 60 kw so that the increased load required by processing of the wood material therein was about 290 kw.

Temperatures of the mixture within the final or fourth head section 30 were approximately 112.5° C. The compression ratio along the length of the first screw section 80 (i.e., the ratio of the free incremental volume of bore 36 adjacent inlet 38 to the free incremental volume of bore 36 adjacent the end of the first screw section 80) was 3.5:1. In the transition area of the bore 36 between the downstream end of the first screw section 80 and the upstream end of the second screw section 82, an expansion discharge ratio of 1.5:1 was presented (that is, the free incremental volume in the bore 36 at the beginning of the second screw section 82 was 1.5 times the free incremental volume in the bore 36 at the downstream end of the first screw section 80). The compression ratio along the first 1905 mm. length of the second screw section 82 was 1.17:1, while the compression ratio along the entire length of the third screw section 84 was 1.46:1. The compression ratio within bore 36 along the length of the fourth screw section 86 was 1.46:1 if the restriction elements or bars 76, 108, 116 and 126 are removed. The overall net compression ratio of the bore 36 from inlet 38 to the downstream end of the third screw section 84 was 4:1, while the compression ratio from the upstream end of the fourth screw section 86 to the outlet 40 was 15:1, whereby the total net compression ratio from the inlet 38 to the outlet 40 was 60:1. The material during passage through the extruder 20 was compressed in the third processing zones 102, 134 to a bulk volume of about 1/17 of the original bulk volume of material entering the extruder inlet 38.

The extruded wood product was highly refined and exhibited a large number of individual, separated fibers each having a relatively long length and a relatively narrow transverse cross-sectional area. The fibers were cleanly separated and did not present a "fuzzy" appearance.

In this connection, a degree of fibrilation leading to a somewhat "fuzzy" appearance may be desirable in certain senses. Specifically, the fibrilated ends of fibers may act to strengthen the resultant particle board, inasmuch as the fibrilated ends interact with each other during the compression step of board production, thereby increadsing the final overall strength of the board.

We claim:

1. An extruder comprising:
   a head including a casing and structure connected to said casing defining an elongated bore therein having an inlet and an outlet,
   said structure including flighting means presenting a helically-shaped groove for receiving material to be processed; and
   an elongated screw received in said bore and rotatable about its longitudinal axis,
   said screw including a shank portion and flighting means connected to said shank portion,
   said flighting means of said screw presenting a helically-shaped groove for receiving material to be processed and advancing the same in a downstream direction toward said outlet of said head as said screw is rotated,
   said flighting means of said head and said flighting means of said screw each including a first upstream flighting portion and a second downstream flighting portion disposed adjacent said first flighting portion in a direction generally along the length of said bore,
   each of said head and said screw presenting a restricted region having at least one outwardly projecting element extending between said first flighting portion and said second flighting portion of said head and of said screw respectively and disposed in said groove of said head and said groove of said screw correspondingly,
   said at least one element of said screw during rotation of the latter being disposed to pass adjacent said at least one element of said head in order to promote rolling of the material as the same continues to advance in said downstream direction generally toward said outlet.

2. The invention as set forth in claim 1, wherein said at least one element of said head extends in a direction which is oriented in acute angular relationship relative to the general direction of extension of said at least one element of said screw to facilitate twisting of said material as the same is passed through said restricted region of said head and said screw.

3. The invention as set forth in claim 1, wherein said groove of said screw upstream of said at least one element of said screw has a free incremental volume which decreases as said at least one element of said screw is approached to present a compression region for increasing the bulk density of said material before the latter reaches said restricted region of said head and said screw.

4. The invention as set forth in claim 1, wherein said screw and said bore of said head each present complemental, generally conical profiles.

5. The invention as set forth in claim 1, wherein said at least one element of said screw extends in a plane generally parallel to the longitudinal axis of said bore, and said at least one element of said head extends in a direction substantially perpendicular to said first flighting portion and said second flighting portion of said head.

6. The invention as set forth in claim 1, wherein said screw includes a restriction means having a bar disposed in said groove upstream of said at least one element of said screw, said bar extending between adjacent flighting portions and disposed in spaced relationship to said at least one element of said head in directions longitudinally of said bore during rotation of said screw.

7. The invention as set forth in claim 6, wherein said bar and said at least one element of said screw extend in directions generally parallel to the longitudinal axis of said bore.

8. The invention as set forth in claim 1, wherein said structure defining said bore in said head further includes a plurality of elongated ribs disposed upstream of said restricted region and extending in planes substantially parallel to the longitudinal axis of said bore.

9. The invention as set forth in claim 1, wherein said groove of said screw presents a compression region upstream of said restricted region of said screw, and wherein said groove of said screw within said compression region has a free incremental volume which gradually decreases as said restricted region of said screw is approached.

10. The invention as set forth in claim 1, wherein said outlet of said bore comprises an annular opening surrounding said screw, said opening being directly open to the atmosphere for unrestricted discharge of materials.

11. The invention as set forth in claim 1; and including means for rotating said screw at a speed within the range of about 100 r.p.m. to about 500 r.p.m.

12. The invention as set forth in claim 11, wherein said screw is rotated at a speed within the range of about 250 r.p.m. to about 350 r.p.m.

13. The invention as set forth in claim 1, wherein said structure defining said bore and said flighting means of said screw cooperatively present total available incremental volumes directly adjacent said inlet of said bore and said restricted regions respectively, and wherein said incremental volume adjacent said inlet is in the range of about 20 times to about 100 times said incremental volume adjacent said restricted regions.

14. The invention as set forth in claim 13, wherein said incremental volume adjacent said inlet is in the range of about 70 times to about 50 times said incremental volume adjacent said restricted regions.

15. An extruder comprising:
   a head including a casing and structure connected to said casing defining an elongated bore therein having an inlet and an outlet,
   said structure including flighting means presenting a helically-shaped groove for receiving material to be processed; and
   an elongated screw received in said bore and rotatable about its longitudinal axis,
   said screw including a shank portion and flighting means connected to said shank portion, said flighting means of said screw presenting a helically-shaped groove for receiving material to be processed and advancing the same in a downstream direction toward said outlet of said head as said screw is rotated, said groove of one of said screw and said head presenting at least two processing zones to sequentially receive material passing through said extruder, said at least two processing zones presenting, in sequential order, a material compression region followed by a restricted region which is followed by a decompression region, said one of said screw and said head including an outwardly projecting element disposed in said groove of said one of said screw and said head and in one of said restricted regions, said element extending in a direction generally along the length of said bore.

16. The invention as set forth in claim 15, wherein said restricted regions of two of said at least two processing zones are disposed approximately 180° apart on opposite sides of said screw.

17. The invention as set forth in claim 15, wherein said flighting means presenting said groove of said one of said head and said screw has outermost portions, and wherein said element includes an outer surface substantially flush with said outermost portions.

18. The invention as set forth in claim 15, wherein said restricted region of one of said zones is downstream of the restricted region of another of said zones, and said groove of said head and said groove of said screw cooperatively present respective free incremental volumes in said one downstream zone and in said another zone, and said incremental volume in said one downstream zone is less than the incremental volume in said another zone.

19. An extruder screw comprising:
an elongated shank portion rotatable about its longitudinal axis and presenting an upstream end and an opposed downstream end;
flighting means extending along the length of said shank portion between said upstream and downstream ends and connected to said shank portion and having a generally helical configuration,
said flighting means including a pair of spaced wall portions extending outwardly from said shank portion and a bottom portion interconnecting said wall portions to define a generally helically-shaped groove therebetween for receiving material and advancing the same in a downstream direction,
said flighting means including a first upstream elongated flighting portion, a second downstream elongated flighting portion disposed adjacent said first flighting portion along the length of the longitudinal axis of said shank portion, a third elongated flighting portion and a fourth elongated flighting portion, the elongated flighting portions being substantially continuous along the respective lengths thereof;
restriction means disposed in said groove and including at least one element interconnecting said first flighting portion and said second flighting portion in intersecting relation to each of the latter, said at least one element projecting outwardly away from the longitudinal axis of said screw; and
a bar spaced from said element and extending between said third flighting portion and said fourth flighting portion to present a second restriction means.

20. The invention as set forth in claim 19, wherein said bar is spaced from said element in a direction downstream of said groove, wherein said first flighting portion, said second flighting portion, said third flighting portion and said fourth flighting portion each present an outer surface, and wherein said bar and said element each present an outer surface, and wherein any distance between said bar and said outer surface of said third flighting portion and said outer surface of said fourth flighting portion is less than the distance between said outer surface of said element and said outer surface of said first flighting portion and said second flighting portion.

21. The invention as set forth in claim 20, wherein said outer surface of said bar is substantially flush with said outer surface of said third flighting portion and said fourth flighting portion.

22. The invention as set forth in claim 19, wherein said bar is spaced from said element in a direction downstream of said groove, and is disposed approximately 180° from said element about the longitudinal axis of said shank portion.

23. An extruder screw comprising:
an elongated shank portion rotatable about its longitudinal axis and presenting an upstream end and an opposed downstream end;
flighting means extending along the length of said shank portion between said upstream and downstream ends and connected to said shank portion and having a generally helical configuration,
said flighting means including a pair of spaced wall portions extending outwardly from said shank portion and a bottom portion interconnecting said wall portion to define a generally helically-shaped groove therebetween for receiving material and advancing the same in a downstream direction,
said flighting means including a first upstream elongated flighting portion, and a second downstream elongated flighting portion disposed adjacent said first flighting portion along the length of the longitudinal axis of said shank portion,
said first flighting portion and said second flighting portion each being substantially continuous along the respective lengths thereof; and
restriction means disposed in said groove and including at least one element interconnecting said first flighting portion and said second flighting portion in intersecting relation to each of the latter, said at least one element projecting outwardly away from the longitudinal axis of said screw,
said screw presenting an overall, generally conical configuration.

24. An extruder screw comprising: an elongated shank portion rotatable abut its longitudinal axis and presenting an upstream end and an opposed downstream end;
flighting means extending along the length of said shank portion between said upstream and downstream ends and connected to said shank portion and presenting a generally helically-shaped, elongated groove for receiving material to be processed in advancing the material in a downstream direction,
said flighting means including a first upstream elongated flighting portion, and a second downstream elongated flighting portion disposed adjacent said first flighting portion along the length of the longitudinal axis of said shank portion; and restriction means disposed in said groove and including at least one element extending between said first flighting portion and said second flighting portion in a direction generally perpendicular to the longitudinal axis of said first flighting portion and said second flighting portion, said at least one element projecting outwardly in a direction away from the longitudinal axis of said shank portion, said screw presenting an overall, generally conical configuration.

25. The invention as set forth in claim 24, wherein said element extends in a direction disposed at an acute angle relative to said longitudinal axis of said shank.

26. The invention as set forth in claim 24, wherein said flighting means has an outer diameter which gradually decreases along the length of said groove.

27. The invention as set forth in claim 24, wherein said flighting means includes a third elongated flighting portion and a fourth elongated flighting portion; and including a bar spaced from said element and extending between said third flighting portion and said fourth flighting portion in direction generally perpendicular to the longitudinal axis of said third flighting portion and said fourth flighting portion to present a second restriction means.

28. An extruder screw comprising:
an elongated shank portion rotatable about its longitudinal axis; and
means connected to said shank portion and defining flighting having a generally helical configuration,
said flighting-defining means including a pair of spaced wall portions extending outwardly from said shank portion and a bottom portion interconnecting said wall portions to define an elongated, generally helically-shaped groove therebetween,
said flighting-defining means having at least two material processing zones which each present, in sequential order along the length of said groove, a compression region followed by a decompression region,
said wall portions being continuous along the length of said groove within each of said material processing zones,
said groove presenting a free incremental volume which decreases in magnitude along the length of said groove in said compression region as the decompression region of the respective zone is approached,
said groove presenting a free incremental volume which increases in magnitude along the length of said groove in said decompression region in a direction away from the compression region of the corresponding zone.

29. The invention as set forth in claim 28, wherein at least one of said at least two material processing zones includes a first elongated flighting portion and a second elongated flighting portion; and including a bar-like element extending between said first flighting portion and said second flighting portion in a direction substantially perpendicular to the longitudinal axes of said first flighting portion and said second flighting portion to thereby present a restricted region.

30. The invention as set forth in claim 29, wherein said bar is disposed in said groove between said compression region and said decompression region.

31. The invention as set forth in claim 29; and including at least one bar-like element disposed in said groove in spaced relationship to said bar.

32. The invention as set forth in claim 28, wherein said screw presents an overall, generally conical configuration.

33. The invention as set forth in claim 28, wherein one of said at least two material processing zones is located upstream of another of said at least two material processing zones, and wherein said one zone extends along said groove in a certain arc about the longitudinal axis of said shank, and said another zone extends along said groove in an arc about said longitudinal axis which is less than said certain arc.

34. The invention as set forth in claim 28, wherein one of said material processing zones is disposed upstream of the other of said material processing zones, and said upstream material processing zone extends along said groove in an arc approximately 360° about the longitudinal axis of said shank, and wherein said other of said at least two zones extends in an arc approximately 135° about the longitudinal axis of said shank.

35. An extruder screw comprising:
an elongated shank portion rotatable about its longitudinal axis; and
means connected to said shank portion and defining flighting having a generally helical configuration,
said flighting-defining means including a pair of spaced wall portions extending outwardly from said shank portion and a bottom portion interconnecting said wall portions to define an elongated, generally helically-shaped groove therebetween,
said flighting-defining means having at least two material processing zones which each present, in sequential order along the length of said groove, a compression region followed by a decompression region,
said bottom portion of said flight-defining means having a root diameter which is substantially uniform across the width of said groove and which increases in magnitude along the length of said groove within each of said compression regions as the decompression region of the respective material processing zone is approached,
said root diameter of said bottom portion decreasing in value along the length of said groove within each of said decompression regions in a direction away from the compression region of the respective zone.

36. The invention as set forth in claim 35, wherein one of said at least two material processing zones lies upstream of another of said at least two material processing zones along the length of said groove, and wherein said one material processing zone extends along said groove in a certain arc about said longitudinal axis, and said another zone extends along said groove in an arc about said longitudinal axis which is smaller than said certain arc.

37. The invention as set forth in claim 35, wherein said screw presents an overall, generally conical configuration.

38. The invention as set forth in claim 35; and including a bar extending transversely across said groove in a location between said compression region and said decompression region of at least one of said zones.

39. The invention as set forth in claim 35, wherein each of said at least two material processing zones additionally includes a restricted region disposed between said compression region and said decompression region of the corresponding zone; and further including a bar extending transversely across said groove in each of said restricted regions, said bars each lying in respective planes that are generally parallel with the longitudinal axis of said shank.

40. A head for a material-processing extruder comprising:
   a casing; and
   structure connected to said casing defining an elongated bore having an inlet and an outlet,
   said structure including flighting means presenting an elongated helically-shaped groove for receiving material to be processed and directing the same in a downstream direction toward said outlet of said bore,
   said flighting means including a first flighting portion and a second flighting portion disposed adjacent said first flighting portion in a direction substantially parallel with the longitudinal axis of said bore,
   said structure having means defining a restricted region including at least one element disposed in said groove and extending between said first flighting portion and said second flighting portion,
   said at least one element projecting outwardly toward the longitudinal axis of said bore,
   said restricted region being spaced from said outlet of said bore for restricting the passage of any material passing through said bore before being discharged through said outlet.

41. The invention as set forth in claim 40, wherein said at least one element of said means defining said restricted region extends in a direction generally along the length of said bore.

42. The invention as set forth in claim 40, wherein said groove upstream of said restricted region presents a free incremental volume which generally continuously decreases as said restricted region is approached to increase the bulk density of material before the latter reaches said at least one element.

43. The invention as set forth in claim 40, wherein said bore has a generally conical configuration.

44. The invention as set forth in claim 40, wherein said means defining said restricted region includes a first element and a second element extending in generally parallel relationship to said first element in spaced disposition from the latter.

45. The invention as set forth in claim 40; wherein said structure including said flighting means further defines a compression region upstream of said restricted region and also defines a passage region upstream of said compression region, and wherein said groove presents free incremental volumes in said passage region, said compression region and said restricted region respectively, said incremental volume in said passage region being greater then said incremental volume in said compression region which, in turn, is greater than any incremental volume in said restricted region.

46. The invention as set forth in claim 45, wherein said compression region extends through an arc of approximately 145° about the longitudinal axis of said bore.

47. The invention as set forth in claim 40, wherein said head further includes a plurality of elongated ribs disposed upstream of said flighting means, wherein said ribs extend in respective planes that are generally parallel to the longitudinal axis of said bore.

48. The invention as set forth in claim 40, wherein said first flighting portion, said second flighting portion and said at least one element each include an outer surface, and wherein said outer surface of said at least one element is substantially flush with said outer surface of said first flighting portion and said outer surface of said second flighting portion.

49. A head for a material-processing extruder comprising:
   a casing; and
   structure connected to said casing defining an elongated bore having an inlet and an outlet,
   said structure including flighting means presenting a first elongated, helically shaped groove and a second elongated, helically shaped groove disposed in side-by-side relationship to said first groove, said first groove and said second groove being adapted to receive materials to be processed and direct the same in a downstream direction toward said outlet of said bore,
   said flighting means including a first flighting portion and a second flighting portion disposed adjacent said first flighting portion transversely across said first groove in a direction substantially parallel with the longitudinal axis of said bore,
   said flighting means also including a third flighting portion and a fourth flighting portion disposed adjacent said third flighting portion transversely across said second groove in a direction substantially parallel with the longitudinal axis of said bore,
   said structure having means defining a restricted region in said first groove including at least one element disposed in said first groove and extending between said first flighting portion and said second flighting portion,
   said groove having respective free incremental volumes adjacent said restricted region in said first groove in directions upstream and downstream of said at least one element in said first groove which is greater than any free incremental volume of said first groove in locations between said at least one element and said longitudinal axis of said bore,
   said structure further having means defining a restricted region in said second groove including at least one element disposed in said second groove and extending between said third flighting portion and said fourth flighting portion,
   said second groove having respective free incremental volumes adjacent said restricted region in said second groove in directions upstream and downstream of said at least one element in said second groove which is greater than any free incremental volume of said second groove in locations between said at least one element and said longitudinal axis of said bore,
   said restricted region in said first groove and said restricted region in said second groove being spaced from said outlet of said bore for restricting the passage of any material passing through said bore before the same is discharged through said outlet.

50. The invention as set forth in claim 49, wherein said restricted region in said first groove is disposed approximately 90° in an arc about the longitudinal axis of said bore from said restricted region in said second groove.

51. The invention as set forth in claim 49, wherein said at least one element of said means defining said restricted region in said first groove and said at least one element of said means defining said restricted region in said second groove each present respective longitudinal axes lying in respective planes that are generally parallel to the longitudinal axis of said bore.

52. The invention as set forth in claim 49, wherein said bore has a generally conical configuration.

53. The invention as set forth in claim 49, wherein said structure defining said bore includes a plurality of ribs disposed upstream from said flighting means and extending in respective planes that are generally parallel to the longitudinal axis of said bore.

54. The invention as set forth in claim 49, wherein said flighting means further presents a third, elongated, helically shaped groove and a fourth, elongated, helically shaped groove, said first groove, said second groove, said third groove and said fourth groove being disposed in side-by-side relationship, and wherein said structure further includes means defining a restricted region in said third groove and said fourth groove respectively, said restricted regions of said first groove, said second groove, said third groove and said fourth groove being spaced in said bore at intervals approximately 90° about the longitudinal axis of said bore.

55. The invention as set forth in claim 54, wherein said means defining said restricted regions in said third groove and in said fourth groove include at least one element disposed in said third groove and in said fourth groove respectively, and wherein said at least one element in said first groove, said at least one element in said second groove, said at least one element in said third groove and said at least one element in said fourth groove each extend in directions generally along the length of said bore.

* * * * *